US012682165B2

(12) United States Patent
Prasad et al.

(10) Patent No.: US 12,682,165 B2
(45) Date of Patent: Jul. 14, 2026

(54) METHOD AND SYSTEM FOR CHARACTER-TO-CHARACTER MODELING FOR WORD SUGGESTION AND AUTO-CORRECTION

(71) Applicant: TALENT UNLIMITED ONLINE SERVICES PRIVATE LIMITED, Delhi (IN)

(72) Inventors: Ankit Prasad, Jamshedpur (IN); Rahul Prasad, Gurugram (IN); Achyut Saxena, Hathras (IN); Siddharth Agarwal, Kolkata (IN)

(73) Assignee: TALENT UNLIMITED ONLINE SERVICES PRIVATE LIMITED, Delhi (IN)

( * ) Notice: Subject to any disclaimer, the term of this patent is extended or adjusted under 35 U.S.C. 154(b) by 281 days.

(21) Appl. No.: 18/492,434

(22) Filed: Oct. 23, 2023

(65) Prior Publication Data

US 2025/0103806 A1     Mar. 27, 2025

(30) Foreign Application Priority Data

Sep. 22, 2023     (IN) .............................. 202311063671

(51) Int. Cl.
| | |
|---|---|
| *G06F 40/00* | (2020.01) |
| *G06F 40/274* | (2020.01) |
| *G06F 40/284* | (2020.01) |
| *G06N 3/0442* | (2023.01) |

(52) U.S. Cl.
CPC .......... *G06F 40/274* (2020.01); *G06F 40/284* (2020.01); *G06N 3/0442* (2023.01)

(58) Field of Classification Search
CPC .... G06F 40/274; G06F 40/284; G06F 40/232; G06N 3/0442
See application file for complete search history.

(56) References Cited

U.S. PATENT DOCUMENTS

| | | | | | |
|---|---|---|---|---|---|
| 6,047,300 | A | * | 4/2000 | Walfish ................. | G06F 40/232 |
| | | | | | 715/257 |
| 8,200,865 | B2 | * | 6/2012 | Gutowitz .............. | G06F 40/274 |
| | | | | | 341/26 |

(Continued)

*Primary Examiner* — Wilson W Tsui
*Assistant Examiner* — David Faber
(74) *Attorney, Agent, or Firm* — Goudie, PLLC

(57) ABSTRACT

A method and a system for character-to-character modeling for next-word prediction and auto correction are provided. The method is based on character-to-character modeling. The method envisages the use of an edit distance and a hash table for creating valid candidates based on the cleaned input text, for next-word prediction and auto-correction. The next-word creation is performed when the input text ends with a space character and the auto-correction is performed when the input text ends with a letter. The edit distance and the hash table are employed to identify valid candidates and to remove invalid candidates. Furthermore, an encoder-decoder model is used to process the valid candidates, generate completed words, and subsequently create word suggestions based on the completed words. The word suggestions are subsequently optimized into highly probable candidates using a language model and a scoring and ranking algorithm.

10 Claims, 7 Drawing Sheets

(56) References Cited

U.S. PATENT DOCUMENTS

| | | | | |
|---|---|---|---|---|
| 8,516,367 | B2 * | 8/2013 | Archer | G06F 40/274 |
| | | | | 715/257 |
| 9,122,376 | B1 * | 9/2015 | Brotherston | G06F 3/0237 |
| 9,128,921 | B2 * | 9/2015 | Griffin | G06F 40/274 |
| 9,514,111 | B1 * | 12/2016 | Cornea | G06F 40/232 |
| 11,543,895 | B2 * | 1/2023 | Ballagas | G06F 3/015 |
| 11,934,461 | B2 * | 3/2024 | Setlur | G06F 40/30 |
| 2008/0189605 | A1 * | 8/2008 | Kay | G06F 40/274 |
| | | | | 715/257 |
| 2011/0099506 | A1 * | 4/2011 | Gargi | G06F 3/0236 |
| | | | | 715/773 |
| 2013/0325442 | A1 * | 12/2013 | Dahlmeier | G06F 40/274 |
| | | | | 704/9 |
| 2014/0032218 | A1 * | 1/2014 | Yeung | G06F 40/232 |
| | | | | 704/E11.001 |
| 2017/0336969 | A1 * | 11/2017 | Bi | G06F 40/274 |
| 2018/0107642 | A1 * | 4/2018 | Gliozzo | G06F 40/232 |
| 2018/0107643 | A1 * | 4/2018 | Gliozzo | G06F 40/232 |
| 2019/0236132 | A1 * | 8/2019 | Zhu | G06F 40/30 |
| 2021/0141860 | A1 * | 5/2021 | Karagiannis | G06N 20/00 |
| 2023/0394040 | A1 * | 12/2023 | Gupta | G06F 16/90324 |
| 2024/0211701 | A1 * | 6/2024 | Haikin | G06F 40/279 |

* cited by examiner

<u>100</u>

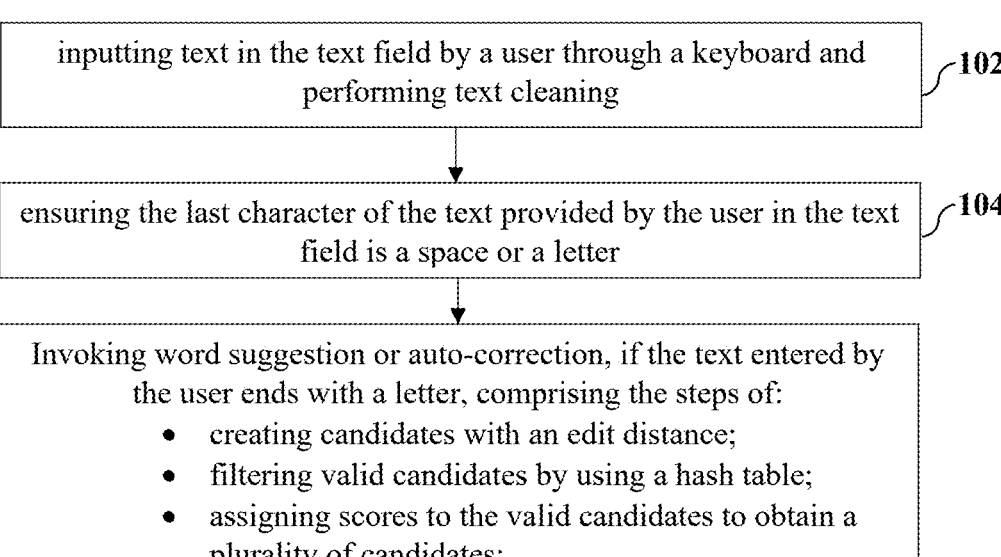

inputting text in the text field by a user through a keyboard and performing text cleaning   ⌒102 ensuring the last character of the text provided by the user in the text field is a space or a letter   ⌒104

Invoking word suggestion or auto-correction, if the text entered by the user ends with a letter, comprising the steps of:
- creating candidates with an edit distance;
- filtering valid candidates by using a hash table;
- assigning scores to the valid candidates to obtain a plurality of candidates;
- passing each of the plurality of candidates to an encoder-decoder model to obtain completed words
- concatenating each of the completed words and assigning scores and ranking; and
- displaying the word suggestion on a suggestion strip

⌒106 invoking word prediction, if the text entered by the user ends with a space, comprising the steps of:
- fetching an auto-corrected candidate from the last suggestion;
- calculating the score for the auto-corrected candidate;
- selecting the auto-corrected candidate with the highest score;
- replacing the last word with a threshold candidate for next word prediction if the score of the auto-corrected candidate is greater than the threshold candidate;
- sending the text for next word prediction if the score of the auto-corrected candidate is less than the threshold candidate;
- displaying the word prediction on the suggestion strip.

```
Model: "model_1"

Layer (type)                    Output Shape            Param #     Connected to
==================================================================================
input_1 (InputLayer)            [(None, 25)]            0 embedding (Embedding)           (None, 25, 96)          2976        input_1[0][0]

batch_normalization (BatchNorma (None, 25, 96)          384         embedding[0][0]

conv1d (Conv1D)                 (None, 24, 256)         49408       batch_normalization[0][0]

conv1d_3 (Conv1D)               (None, 25, 256)         73984       batch_normalization[0][0]

conv1d_1 (Conv1D)               (None, 23, 256)         131328      conv1d[0][0]

conv1d_4 (Conv1D)               (None, 23, 512)         393728      conv1d_3[0][0]

conv1d_2 (Conv1D)               (None, 21, 96)          73824       conv1d_1[0][0]

conv1d_5 (Conv1D)               (None, 21, 96)          147552      conv1d_4[0][0]

batch_normalization_1 (BatchNor (None, 21, 96)          384         conv1d_2[0][0]

batch_normalization_2 (BatchNor (None, 21, 96)          384         conv1d_5[0][0]

concatenate (Concatenate)       (None, 21, 192)         0           batch_normalization_1[0][0]
                                                                    batch_normalization_2[0][0]

batch_normalization_6 (BatchNor (None, 21, 192)         768         concatenate[0][0]

bidirectional (Bidirectional)   [(None, 21, 300), (N    411600      batch_normalization_6[0][0]

concatenate_1 (Concatenate)     (None, 300)             0           bidirectional[0][1]
                                                                    bidirectional[0][3]

concatenate_2 (Concatenate)     (None, 300)             0           bidirectional[0][2]
                                                                    bidirectional[0][4]
==================================================================================
Total params: 1,286,320
Trainable params: 1,285,360
Non-trainable params: 960
```

FIG. 4B

Model: "model_2"

| Layer (type) | Output Shape | Param # | Connected to |
|---|---|---|---|
| inf_decoder_inputs (InputLayer) | [(None, None)] | 0 | [] |
| embedding_1 (Embedding) | (None, None, 96) | 2976 | ['inf_decoder_inputs[0][0]'] |
| batch_normalization_7 (BatchNormalization) | (None, None, 96) | 384 | ['embedding_1[1][0]'] |
| state_input_h (InputLayer) | [(None, 300)] | 0 | [] |
| state_input_c (InputLayer) | [(None, 300)] | 0 | [] |
| lstm_1 (LSTM) | [(None, None, 300), (None, 300), (None, 300)] | 476400 | ['batch_normalization_7[1][0]', 'state_input_h[0][0]', 'state_input_c[0][0]'] |
| batch_normalization_8 (BatchNormalization) | (None, None, 300) | 1200 | ['lstm_1[1][0]'] |
| dense (Dense) | (None, None, 96) | 28896 | ['batch_normalization_8[1][0]'] |
| leaky_re_lu (LeakyReLU) | (None, None, 96) | 0 | ['dense[1][0]'] |
| batch_normalization_9 (BatchNormalization) | (None, None, 96) | 384 | ['leaky_re_lu[1][0]'] |
| dense_1 (Dense) | (None, None, 31) | 3007 | ['batch_normalization_9[1][0]'] |

Total params: 513247 (1.96 MB)
Trainable params: 512263 (1.95 MB)
Non-trainable params: 984 (3.84 KB)

FIG. 5B

METHOD AND SYSTEM FOR CHARACTER-TO-CHARACTER MODELING FOR WORD SUGGESTION AND AUTO-CORRECTION

CROSS-REFERENCE TO RELATED APPLICATIONS

The present application claims the priority from the Indian Non-Provisional Application with Ser. No. 202311063671 filed on Sep. 22, 2023, with the title "A METHOD AND SYSTEM FOR CHARACTER-TO-CHARACTER MODELING FOR WORD SUGGESTION AND AUTO-CORRECTION". The contents of the above-mentioned Application are included in entirety as reference herein.

BACKGROUND

Technical Field

The embodiments herein is generally related to the field of mobile applications based on artificial intelligence. The embodiments herein is particularly related to a method and system for word prediction based on deep learning models. The embodiments herein is more particularly related to deep learning model-based system and method for contextualized word prediction through textual and visual communication mediums such as chatting applications, virtual text input methods like keyboards, social networking applications, and operating systems.

Description of the Related Art

Computers and other electronic devices such as mobile phones, laptops, and tablets are widely used for text-based communication in the connected world. Nowadays, various communication devices with applications are available to facilitate staying connected with friends, family, and professional colleagues. Most people spend a significant amount of time each day using mobile device keyboards for composing emails, texting, engaging in social media, and more. Yet, mobile keyboards are still cumbersome to handle. The average user is roughly 35% slower typing on a mobile device than on a physical keyboard. To aid a user in typing quickly and accurately, many communication applications incorporate features for word completion or text prediction. Word completion, or auto-complete, is a feature in a communication or messaging application that predicts the rest of a word a user is typing based on the first letters typed. Word completion speeds up human-computer interactions by correctly predicting words being typed. Furthermore, Context completion is a text editor feature, similar to word completion, which completes words (or entire phrases) based on the current context and context of other similar words within the same document, or within some training data set. An advantage of context completion over word completion is the ability to predict anticipated words more precisely and even with no initial letters.

Moreover, there are various applications that help users complete text entry by suggesting words that are consistent with text already entered by the user. Therefore, intelligent text entry systems are the need of the hour. However, the text entry systems with word completions along with auto-corrections are already in practice. Any modern text entry system requires a strong decoder for word suggestions as well as for auto-corrections while keeping error minimum during touch/tap to key mapping. Furthermore, mobile keyboards are subjected to mainly two types of error, one is errors due to fat finger typing, and another is cognitive and motor errors. One of the most prominent prior available methods considered is a virtual keyboard application for Android. The virtual keyboard application for intelligent text entry is made up of a combination of a deep learning network known as Long Short-Term Memory (LSTM) and Fine State Transducers (FST). The LSTM is used for reducing errors in touch to key mappings and FST is used for finding or predicting the most likely words or word sequences for the given input touch sequence.

However, the existing system available is slow in providing word suggestions or auto-corrections and requires more space since it is larger in size. Therefore, the existing system utilizes more time as the number of tap/touch entries by the user required to reach the intended words or sequence is greater.

Hence, in view of this, there is a need for a system and method for character-to-character modeling for word suggestion, employing spatial correlations between characters of words, by suggesting all possibilities for word completions and auto-correction options for accepted suggestions.

The above-mentioned shortcomings, disadvantages, and problems are addressed herein, and which will be understood by reading and studying the following specification.

OBJECTIVES OF THE EMBODIMENTS HEREIN

The primary object of the embodiments herein is to provide a method and a system for character-to-character modeling for word suggestion and auto-correction.

Another object of the embodiments herein is to provide a method and a system for suggesting all possibilities of word completion by employing spatial correlations between characters of words.

Yet another object of the embodiments herein is to provide a method and system for word completion, along with an auto-correction option for accepted suggestions.

Yet another object of the embodiments herein is to provide a method and a system for character-to-character modeling for word suggestion and auto-correction through three stages such as data preparation stage, prediction stage, and final stage.

Yet another object of the embodiments herein is to provide a method and a system for character-to-character modeling for word suggestion and auto-correction by utilizing smaller size or lesser space as the system involves a smaller number of parameters.

Yet another object of the embodiments herein is to provide a method and a system for character-to-character modeling for word suggestion and auto-correction, utilizing a reduced amount of time and thereby saving user time by saving a number of tap/touch entries by the user required to reach intended words or sequence.

Another object of the embodiments herein is to provide a method and a system for character-to-character modeling for word suggestion and auto-correction, by utilizing edit distance and hash table in the data preparation stage for optimizing input to the encoder and thus, reducing the number of words to be encoded, and in turn reducing latency time.

Yet another object of the embodiments herein is to provide a method and a system for character-to-character modeling for word suggestion and auto-correction, employing a convolution block in the encoder for capturing the relationship between characters within words by reading spatial correlation and optimizing input for the decoder to decode suggestions for word completions.

These and other objects and advantages of the embodiments herein will become readily apparent from the following detailed description taken in conjunction with the accompanying drawings.

SUMMARY

The various embodiments of the embodiments herein provide a system and a method for character-to-character modeling for word suggestion and auto-correction. The method involves various stages, such as a data preparation stage, wherein the data is prepared using an edit distance and a hash table for an encoder. The edit distance is employed for suitable candidate creation for touch input, and subsequently, the hash table is employed for removing invalid candidates. An encoder-decoder model is used to encode valid candidates for touch input and then decode the candidates into word suggestions for completion. Further, in the encoder, a convolution block is introduced before bidirectional LSTM (Long Short-Term Memory) to encode spatial information. Hence, the encoder is basically an RNN (Recurrent Neural Network) of CNN (Convolutional Neural Network). Furthermore, the decoder is an LSTM followed by the Neural Network Classifier for selecting word suggestions. Finally, the word suggestions from the decoder are further optimized into more probable candidates using a language model with a scoring and ranking algorithm.

According to one embodiment of the present invention, a method for character-to-character modeling for word suggestion and auto-correction is provided. The method comprises inputting text in the text field by a user through a keyboard and performing text cleaning. The method further involves ensuring the last character of the text provided by the user in the text field is a space or a letter. Further, the method involves invoking word suggestion or auto-correction, if the text entered by the user ends with a letter, such that the method for word suggestion or auto-correction comprises the steps of: creating candidates with an edit distance; filtering valid candidates by using a hash table; assigning scores to the valid candidates to obtain a plurality of candidates; passing each of the plurality of candidates to an encoder-decoder model to obtain completed words; concatenating each of the completed words and assigning scores and ranking; and displaying the word suggestion on a suggestion strip. The candidates are possible words suggested or auto-corrected by the method as the user types in the text field. Besides, the valid candidates comprise only the alphabet of the desired language. Furthermore, the method involves invoking word prediction, if the text entered by the user ends with space; and the method for word prediction comprises the steps of: fetching an auto-corrected candidate from the last suggestion; calculating the score for the auto-corrected candidate, and selecting the auto-corrected candidate with the highest score; replacing the last word with a threshold candidate and sending the text for next word prediction if the score of the auto-corrected candidate is greater than the threshold candidate; sending the text for next word prediction if the score of the auto-corrected candidate is less than the threshold candidate; and obtaining the next word prediction and displaying the word prediction on the suggestion strip.

According to one embodiment of the present invention, text cleaning is a process to remove the invalid characters in the text before subjecting the characters in the text to tokenization. The invalid characters include special characters, numbers, and other characters excluding alphabets. Tokenization is a process of providing number representation for each letter in the text.

According to one embodiment of the present invention, the edit distance is a measure of the difference between two words, achieved by performing actions including insertion, deletion, and substitution. Each of the actions performed individually is counted as a step and the edit distance is the number of times each step is performed to reach one word to another. For instance, an example of 1 edit distance is Apple and Apples, Whom and Who, Where and Here, and Cat and Bat. Hence, the edit distance feature induces proximity errors in the dataset to tackle auto-correction. Once the data is prepared, the data is passed through the tokenizers, which allot each letter a particular token, and the token is a number representation for each letter.

According to one embodiment of the present invention, the hash table is used to remove invalid candidates based on a valid prefix list to obtain valid characters. The valid prefix list is a list with at least a minimum of one letter as input, comprising only alphabets of the desired language, and provided with a token number. Moreover, the token number is the number representation for each letter in the text. All other characters other than the alphabet are considered to be invalid inputs. In addition, the valid prefix list can also end with a space invoking word prediction, and end with a letter thus invoking either word suggestion or auto-correction.

According to one embodiment of the present invention, the method consists of three stages for word suggestion, auto-correction, and word prediction, including a data preparation stage, a prediction stage, and a word suggestion stage to obtain the output involving word suggestion, word/auto-correction, and word prediction. The data preparation stage comprises creating a candidate using the edit distance and removing invalid candidates based on valid prefix lists using the hash table to obtain valid candidates. The prediction stage involves passing the valid candidates from the data preparation stage as input to an encoder and decoding output through a decoder. The encoder is a deep learning model made with cascade interconnection of convolutional block and bi-directional LSTM (Long Short-Term Memory) for encoding the output of the data preparation stage. Furthermore, the decoder is an LSTM (Long Short-Term Memory) based model for predicting all possible suggestions for word completion. Correspondingly, the word suggestion stage involves providing word suggestions to the user along with auto-correction after the end of the word, encountering space from the keyboard.

According to one embodiment of the present invention, the encoder model is composed of multiple layers, including an embedding layer, a convolution block comprising multiple convolutional layers, batch normalization, and bidirectional LSTM, to provide an output that is passed to the decoder. The embedding layer transforms input words into dense numerical vectors, capturing semantic relationships and contextual data. Furthermore, the convolutional block helps to manage sequential input by identifying local patterns and pulling out pertinent information from nearby words or letters to predict the next word from the text input. In addition, the bidirectional LSTM processes the input sequence simultaneously in both forward and backward directions, enabling the encoder model to extract context from both past and future data. The bidirectional LSTM is also assigned weights which are used as the initial weights for the decoder.

According to one embodiment of the present invention, the decoder model obtains the input from the encoder model, which is passed through multiple layers comprising an embedding layer, an LSTM layer, and a dense layer to provide word suggestions. The LSTM layer helps in the collection and retention of long-term dependencies in the input text. The dense layer carries out the final classification or regression operation in a language model by translating the learned features to the desired output format. Furthermore, the word suggestions obtained from the decoder are optimized into probable candidates by using beam search, language model, penalty, and ranking. The beam search involves optimizing the time and solution. The language model controls the scoring according to the valid prefix given by the user and the candidates obtained from the decoder. Further, the penalty influences the score by checking the distance between the last word of the valid prefix input provided by the user and the output obtained by the decoder and penalizing the score according to the distance between the two words. The ranking helps to sort all the candidates according to the score, to provide top-k score candidates.

According to one embodiment of the present invention, a computer-implemented system comprising instructions stored on a non-transitory computer-readable storage medium and executed on a hardware processor in a computer system for character-to-character modeling for word suggestion and auto-correction is provided. The system comprises a data preparation module configured to obtain input text into the text field by a user through a keyboard and perform text cleaning. The data preparation module is also configured to invoke word suggestion or auto-correction by creating candidates with an edit distance and filtering valid candidates by using a hash table if the text entered by the user ends with a letter to invoke word prediction by fetching auto-corrected candidate from the last suggestion if the text entered by the user ends with a space. Further, the candidates are possible words suggested or auto corrected by the system as the user types in the text field, and the valid candidates comprise only alphabets of the desired language. Furthermore, the system comprises a prediction module configured to receive input from the data preparation module to provide word suggestions for completion or word prediction as output. The prediction module is also configured to provide word suggestions by assigning scores to the valid candidates, which is the output of the data preparation module to obtain a plurality of candidates and passing each of the plurality of candidates to an encoder-decoder model to obtain completed words. Furthermore, the prediction module is also configured to provide word prediction by calculating the score for the auto-corrected candidate, selecting the auto-corrected candidate with the highest score, replacing the last word with a threshold candidate, sending the text for next word prediction, if the score of the auto-corrected candidate is greater than the threshold candidate, and sending the text for next word prediction, if the score of the auto-corrected candidate is less than the threshold candidate. Moreover, the system comprises a word suggestion module configured to provide word suggestions as output by concatenating each of the completed words of the prediction module, assigning score and rank, and displaying the word suggestion on a suggestion strip. The system also comprises a word prediction module configured to provide word prediction by obtaining the next word prediction from the prediction module and displaying the word prediction on the suggestion strip.

According to one embodiment of the present invention, text cleaning by the data preparation module is a process to remove the invalid characters in the text before subjecting the characters in the text to tokenization. The invalid characters include special characters, numbers, and other characters excluding alphabets. Tokenization is a process of providing number representation for each letter in the text.

According to one embodiment of the present invention, the edit distance performed by the data preparation module is a measure of the difference between two words, achieved by performing actions including insertion, deletion, and substitution. Each of the actions performed individually is counted as a step and the edit distance is the number of times each step is performed to reach one word to another. For instance, an example of 1 edit distance is Apple and Apples, Whom and Who, Where and Here, and Cat and Bat. Hence, the edit distance feature induces proximity errors in the dataset to tackle auto-correction. Once the data is prepared, the data is passed through the tokenizers, which allot each letter a particular token, and the token is a number representation for each letter.

According to one embodiment of the present invention, the hash table is used by the data preparation module to remove invalid candidates based on a valid prefix list to obtain valid characters. The valid prefix list is a list with at least a minimum of one letter as input, comprising only alphabets of the desired language, and provided with a token number. Moreover, the token number is the number representation for each letter in the text. All other characters other than the alphabet are considered to be invalid inputs. In addition, the valid prefix list can also end with a space invoking word prediction, and end with a letter thus invoking either word suggestion or auto-correction.

According to one embodiment of the present invention, the system consists of three stages for word suggestion, auto-correction, and word prediction, including a data preparation stage, a prediction stage, and a word suggestion stage to obtain the output involving word suggestion, word/auto-correction, and word prediction. The data preparation stage comprises creating a candidate using the edit distance and removing invalid candidates based on valid prefix lists using the hash table to obtain valid candidates using the data preparation module. The prediction stage involves passing the valid candidates from the data preparation stage as input to an encoder and decoding output through a decoder using the prediction module. The encoder is a deep learning model made with cascade interconnection of convolutional block and bi-directional LSTM (Long Short-Term Memory) for encoding output of the data preparation stage. Furthermore, the decoder is an LSTM (Long Short-Term Memory) based model for predicting all possible suggestions for word completion. Correspondingly, the word suggestion stage involves providing word suggestions to the user along with auto-correction after the end of the word, encountering space from the keyboard through a word suggestion or word prediction module.

According to one embodiment of the present invention, the encoder model of the prediction module is composed of multiple layers, including an embedding layer, a convolutional block comprising multiple convolutional layers, batch normalization, and bidirectional LSTM, to provide an output that is passed to the decoder. The embedding layer transforms input words into dense numerical vectors, capturing semantic relationships and contextual data. Furthermore, the convolutional block helps to manage sequential input by identifying local patterns and pulling out pertinent information from nearby words or letters to predict the next word from the text input. In addition, the bidirectional LSTM processes the input sequence simultaneously in both forward and backward directions, enabling the encoder model to extract context from both past and future data. The bidirectional LSTM is also assigned weights which are used as the initial weights for the decoder.

According to one embodiment of the present invention, the decoder model of the prediction module obtains the input from the encoder model, which is passed through multiple layers comprising an embedding layer, an LSTM layer, and a dense layer to provide word suggestions. The LSTM layer helps in the collection and retention of long-term dependencies in the input text. The dense layer carries out the final classification or regression operation in a language model by translating the learned features to the desired output format. Furthermore, the word suggestions obtained from the decoder of the prediction module are optimized into probable candidates by using beam search, language model, penalty, and ranking. The beam search involves optimizing the time and solution. The language model controls the scoring according to the valid prefix given by the user and the candidates obtained from the decoder. Further, the penalty influences the score by checking the distance between the last word of the valid prefix input provided by the user and the output obtained by the decoder and penalizing the score according to the distance between the two words. The ranking helps to sort all the candidates according to the score, to provide top-k score candidates.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which:

FIG. 1 illustrates a flowchart on the method for character-to-character modeling for word suggestion and auto-correction, according to an embodiment of the present invention.

FIG. 4B illustrates the screenshot of the encoder model summary, according to an embodiment of the present invention.

FIG. 5B illustrates the screenshot of the decoder model summary, according to an embodiment of the present invention.

Figure 2:
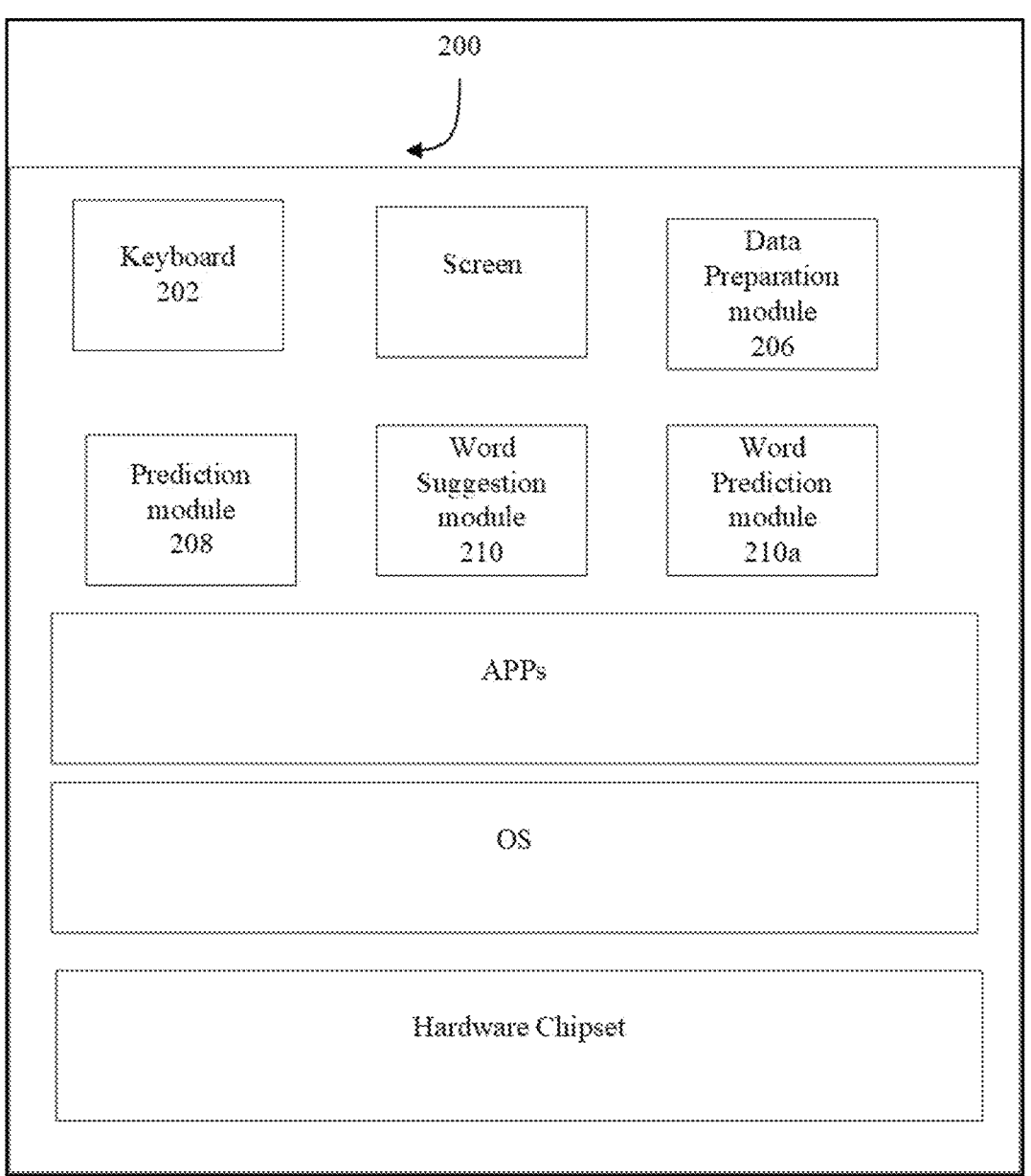
FIG. 2 illustrates an architectural block diagram of an exemplary implementation of the system for character-to-character modeling for word suggestion and auto-correction, according to an embodiment of the present invention.

Although the specific features of the embodiments herein are shown in some drawings and not in others. This is done for convenience only as each feature may be combined with any or all of the other features in accordance with the present invention.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The various embodiments of the embodiments herein provide a system and a method for character-to-character modeling for word suggestion and auto-correction. The method involves various stages, such as a data preparation stage, wherein the data is prepared using an edit distance and a hash table for an encoder. The edit distance is employed for suitable candidate creation for touch input, and subsequently, the hash table is employed for removing invalid candidates. An encoder-decoder model is used to encode valid candidates for touch input and then decode the candidates into word suggestions for completion. Further, in the encoder, a convolution block comprising multiple convolution layers is introduced before bidirectional LSTM (Long Short-Term Memory) to encode spatial information. Hence, the encoder is basically an RNN (Recurrent Neural Network) of CNN (Convolutional Neural Network). Furthermore, the decoder is an LSTM followed by the Neural Network Classifier for selecting word suggestions. Finally, the word suggestions from the decoder are further optimized into more probable candidates using a language model with a scoring and ranking algorithm.

According to one embodiment of the present invention, a method for character-to-character modeling for word suggestion and auto-correction is provided. The method comprises inputting text in the text field by a user through a keyboard and performing text cleaning. The method further involves ensuring the last character of the text provided by the user in the text field is a space or a letter. Further, the method involves invoking word suggestion or auto-correction, if the text entered by the user ends with a letter, such that the method for word suggestion or auto-correction comprises the steps of: creating candidates with an edit distance; filtering valid candidates by using a hash table; assigning scores to the valid candidates to obtain a plurality of candidates; passing each of the plurality of candidates to an encoder-decoder model to obtain completed words; concatenating each of the completed words and assigning scores and ranking; and displaying the word suggestion on a suggestion strip. The candidates are possible words suggested or auto-corrected by the method as the user types in the text field. Besides, the valid candidates comprise only the alphabet of the desired language. Furthermore, the method involves invoking word prediction, if the text entered by the user ends with a space; and the method for word prediction comprises the steps of: fetching an auto-corrected candidate from the last suggestion; calculating the score for the auto-corrected candidate, and selecting the auto-corrected candidate with the highest score; replacing the last word with a threshold candidate and sending the text for next word prediction if the score of the auto-corrected candidate is greater than the threshold candidate; sending the text for next word prediction if the score of the auto-corrected candidate is less than the threshold candidate; and obtaining the next word prediction and displaying the word prediction on the suggestion strip.

According to one embodiment of the present invention, text cleaning is a process to remove the invalid characters in the text before subjecting the characters in the text to tokenization. The invalid characters include special characters, numbers, and other characters excluding alphabets. Tokenization is a process of providing number representation for each letter in the text.

According to one embodiment of the present invention, the edit distance is a measure of the difference between two words, achieved by performing actions including insertion, deletion, and substitution. Each of the actions performed individually is counted as a step and the edit distance is the number of times each step is performed to reach one word to another. For instance, an example of 1 edit distance is Apple and Apples, Whom and Who, Where and Here, and Cat and Bat. Hence, the edit distance feature induces proximity errors in the dataset to tackle auto-correction. Once the data is prepared, the data is passed through the tokenizers, which allot each letter a particular token, and the token is a number representation for each letter.

Furthermore, robust data is prepared with the edit distance, such that the edit distance provides the data that helps in auto-correction, word suggestion, and prediction. The data used for training has two columns, i.e., the text and the target output. A normal sentence is broken down into further small sentences in a progressive manner. The example below shows how a sentence is broken down into small sentences so as to obtain auto-completion and word prediction:

Input, Output
Meeting, id
Meeting ic, id
Meeting ir, id
Meeting i, id
Meeting jd, id In this way, the edit distance also takes the previous words of the sentence into consideration. Furthermore, for auto-correction, the proximity error is injected into the data, such that while typing, the highest probability of a mistype is the user presses the wrong key while writing, which is going to be in proximity to the letter it was aiming for. The proximity error is induced with the consideration of 1 edit distance if the word is less than 4 letters and 2 edit distances for words above 4 letters. Hence, the edit distance is the difference between two words. For instance, for the word's apple and apples, rest and rust have an edit distance of 1 in between them, and the action steps the edit distance takes to reach from one word to another includes addition, removal, or substitution of a particular letter.

According to one embodiment of the present invention, the hash table is used to remove invalid candidates based on a valid prefix list to obtain valid characters. The valid prefix list is a list with at least a minimum of one letter as input, comprising only alphabets of the desired language, and provided with a token number. Moreover, the token number is the number representation for each letter in the text. All other characters other than the alphabet are considered to be invalid inputs. In addition, the valid prefix list can also end with a space invoking word prediction, and end with a letter thus invoking either word suggestion or auto-correction.

According to one embodiment of the present invention, the method consists of three stages for word suggestion, auto-correction, and word prediction, including a data preparation stage, a prediction stage, and a word suggestion stage to obtain the output involving word suggestion, word/auto-correction, and word prediction. The data preparation stage comprises creating a candidate using the edit distance and removing invalid candidates based on valid prefix lists using the hash table to obtain valid candidates. The prediction stage involves passing the valid candidates from the data preparation stage as input to an encoder and decoding output through a decoder. The encoder is a deep learning model made with cascade interconnection of convolutional block and bi-directional LSTM (Long Short-Term Memory) for encoding the output of the data preparation stage. Furthermore, the decoder is an LSTM (Long Short-Term Memory) based model for predicting all possible suggestions for word completion. Correspondingly, the word suggestion stage involves providing word suggestions to the user along with auto-correction after the end of the word, encountering space from the keyboard.

According to one embodiment of the present invention, the encoder model is composed of multiple layers, including an embedding layer, a convolutional block comprising multiple convolutional layers, batch normalization, and bidirectional LSTM, to provide an output that is passed to the decoder. The embedding layer transforms input words into dense numerical vectors, capturing semantic relationships and contextual data. Furthermore, the convolutional block helps to manage sequential input by identifying local patterns and pulling out pertinent information from nearby words or letters to predict the next word from the text input. In addition, the bidirectional LSTM processes the input sequence simultaneously in both forward and backward directions, enabling the encoder model to extract context from both past and future data. The bidirectional LSTM is also assigned weights which are used as the initial weights for the decoder.

Furthermore, the convolutional block of the encoder is used to extract regional patterns and characteristics from the sequential input in a language model where the objective is to predict the next word from a text input. Considering the input text to be a list of words, a vector or embedded representation of each word is possible, and the kernel size or filter size of the convolutional block, which scans the input text, is a sliding window with a fixed size. Moreover, the convolutional block conducts a convolutional mathematical operation as it moves the window over the input. With this action, a new feature representation can be created, also known as a feature map, by combining the values in the window. The number of filters applied to the layer determines the size of the feature map. Hence, the convolution block helps to identify regional dependencies and patterns in the text. For instance, the convolution block can identify particular word or phrase combinations that tend to appear together frequently. Furthermore, the convolutional block can also train various filters, each of which focuses on capturing a particular pattern or feature. The convolutional block can recognize several local patterns simultaneously by utilizing multiple filters, which improves its capacity to comprehend the context of the input text. In order to further process and integrate the collected features, the output of the convolutional block is often sent via other layers like pooling layers or recurrent layers like LSTM. In order to forecast the probability distribution of the word from the learned representations, a thick layer, or SoftMax layer, is eventually frequently used.

Moreover, the convolutional block is introduced before bidirectional LSTM (Long Short-Term Memory) to encode spatial information. Intermittently, the user while typing tends not to rectify their typos, thereby the coordinates that are being touched by the user can be added as additional information in input to the model to provide better results on correction, suggestion, and prediction. Hence, each letter is divided into four specific coordinates so as to avoid unique inputs and limit it just like characters. These coordinates help to understand and get extra information if the user might have typed an incorrect/proximity letter.

According to one embodiment of the present invention, the decoder model obtains the input from the encoder model, which is passed through multiple layers comprising an embedding layer, an LSTM layer, and a dense layer to provide word suggestions. The LSTM layer helps in the collection and retention of long-term dependencies in the input text. The dense layer carries out the final classification, delete or regression operation in a language model by translating the learned features to the desired output format. Furthermore, the word suggestions obtained from the decoder are optimized into probable candidates by using beam search, language model, penalty, and ranking. The beam search involves optimizing the time and solution. The language model controls the scoring according to the valid prefix given by the user and the candidates obtained from the decoder. Further, the penalty influences the score by checking the distance between the last word of the valid prefix input provided by the user and the output obtained by the decoder and penalizing the score according to the distance between the two words. The ranking helps to sort all the candidates according to the score, to provide top-k score candidates.

Furthermore, the language model includes multiple dictionaries, starting with bigrams and to pentagrams. The multiple dictionaries also have the keys for every prefix, and their items are all possible words for that prefix written by the users. Each of these words also has a score associated with it, indicating the frequency at which the user uses it. Also, in the language model, more preference is given to higher n-gram dictionaries.

According to one embodiment of the present invention, a computer-implemented system comprising instructions stored on a non-transitory computer-readable storage medium and executed on a hardware processor in a computer system for character-to-character modeling for word suggestion and auto-correction is provided. The system comprises a data preparation module configured to obtain input text into the text field by a user through a keyboard and perform text cleaning. The data preparation module is also configured to invoke word suggestion or auto-correction by creating candidates with an edit distance and filtering valid candidates by using a hash table if the text entered by the user ends with a letter to invoke word prediction by fetching auto-corrected candidate from the last suggestion if the text entered by the user ends with a space. Further, the candidates are possible words suggested or auto-corrected by the system as the user types in the text field, and the valid candidates comprise only alphabets of the desired language. Furthermore, the system comprises a prediction module configured to receive input from the data preparation module to provide word suggestions for completion or word prediction as output. The prediction module is also configured to provide word suggestions by assigning scores to the valid candidates, which is the output of the data preparation module to obtain a plurality of candidates and passing each of the plurality of candidates to an encoder-decoder model to obtain completed words. Furthermore, the prediction module is also configured to provide word prediction by calculating the score for the auto-corrected candidate, selecting the auto-corrected candidate with the highest score, replacing the last word with a threshold candidate, sending the text for next word prediction, if the score of the auto-corrected candidate is greater than the threshold candidate, and sending the text for next word prediction, if the score of the auto-corrected candidate is less than the threshold candidate. Moreover, the system comprises a word suggestion module configured to provide word suggestions as output by concatenating each of the completed words of the prediction module, assigning scores and ranks, and displaying the word suggestion on a suggestion strip. The system also comprises a word prediction module configured to provide word prediction by obtaining the next word prediction from the prediction module and displaying the word prediction on the suggestion strip.

According to one embodiment of the present invention, text cleaning by the data preparation module is a process to remove the invalid characters in the text before subjecting the characters in the text to tokenization. The invalid characters include special characters, numbers, and other characters excluding alphabets. Tokenization is a process of providing number representation for each letter in the text.

According to one embodiment of the present invention, the edit distance performed by the data preparation module is a measure of the difference between two words, achieved by performing actions including insertion, deletion, and substitution. Each of the actions performed individually is counted as a step and the edit distance is the number of times each step is performed to reach one word to another. For instance, an example of 1 edit distance is Apple and Apples, Whom and Who, Where and Here, and Cat and Bat. Hence, the edit distance feature induces proximity errors in the dataset to tackle auto-correction. Once the data is prepared, the data is passed through the tokenizers, which allot each letter a particular token, and the token is a number representation for each letter.

Furthermore, robust data is prepared with the edit distance, such that the edit distance provides the data that helps in auto-correction, word suggestion, and prediction. The data used for training has two columns, i.e., the text and the target output. A normal sentence is broken down into further small sentences in a progressive manner. The example below shows how a sentence is broken down into small sentences so as to obtain auto-completion and word prediction:

Input, Output
    Meeting, id
    Meeting ic, id
    Meeting ir, id
    Meeting i, id
    Meeting jd, id In this way, the edit distance also takes the previous words of the sentence into consideration. Furthermore, for auto-correction, the proximity error is injected into the data, such that while typing, the highest probability of a mistype is the user presses the wrong key while writing, which is going to be in proximity to the letter it was aiming for. The proximity error is induced with the consideration of 1 edit distance if the word is less than 4 letters and 2 edit distances for words above 4 letters. Hence, the edit distance is the difference between two words. For instance, for the word's apple and apples, rest and rust have an edit distance of 1 in between them, and the action steps the edit distance takes to reach from one word to another includes addition, removal, or substitution of a particular letter.

According to one embodiment of the present invention, the hash table is used by the data preparation module to remove invalid candidates based on a valid prefix list to obtain valid characters. The valid prefix list is a list with at least a minimum of one letter as input, comprising only alphabets of the desired language, and provided with a token number. Moreover, the token number is the number representation for each letter in the text. All other characters other than the alphabet are considered to be invalid inputs. In addition, the valid prefix list can also end with a space invoking word prediction, and end with a letter thus invoking either word suggestion or auto-correction.

According to one embodiment of the present invention, the system consists of three stages for word suggestion, auto-correction, and word prediction, including a data preparation stage, a prediction stage, and a word suggestion stage to obtain the output involving word suggestion, word/auto-correction, and word prediction. The data preparation stage comprises creating a candidate using the edit distance and removing invalid candidates based on valid prefix lists using the hash table to obtain valid candidates using the data preparation module. The prediction stage involves passing the valid candidates from the data preparation stage as input to an encoder and decoding output through a decoder using the prediction module. The encoder is a deep learning model made with cascade interconnection of a convolutional block comprising multiple convolutional layers and bi-directional LSTM (Long Short-Term Memory) for encoding the output of the data preparation stage. Furthermore, the decoder is an LSTM (Long Short-Term Memory) based model for predicting all possible suggestions for word completion. Correspondingly, the word suggestion stage involves providing word suggestions to the user along with auto-correction after the end of the word, encountering space from the keyboard through a word suggestion or word prediction module.

According to one embodiment of the present invention, the encoder model of the prediction module is composed of multiple layers, including an embedding layer, a convolutional block comprising multiple convolutional layers, batch normalization, and bidirectional LSTM, to provide an output that is passed to the decoder. The embedding layer transforms input words into dense numerical vectors, capturing semantic relationships and contextual data. Furthermore, the convolutional block helps to manage sequential input by identifying local patterns and pulling out pertinent information from nearby words or letters to predict the next word from the text input. In addition, the bidirectional LSTM processes the input sequence simultaneously in both forward and backward directions, enabling the encoder model to extract context from both past and future data. The bidirectional LSTM is also assigned weights which are used as the initial weights for the decoder.

Furthermore, the convolutional block of the encoder in the prediction module is used to extract regional patterns and characteristics from the sequential input in a language model where the objective is to predict the next word from a text input. Considering the input text to be a list of words, a vector or embedded representation of each word is possible, and the kernel size or filter size of the convolutional block, which scans the input text, is a sliding window with a fixed size. Moreover, the convolutional block conducts a convolutional mathematical operation as it moves the window over the input. With this action, a new feature representation can be created, also known as a feature map, by combining the values in the window. The number of filters applied to the layer determines the size of the feature map. Hence, the convolution block helps to identify regional dependencies and patterns in the text. For instance, the convolution block can identify particular word or phrase combinations that tend to appear together frequently. Furthermore, the convolutional block can also train various filters, each of which focuses on capturing a particular pattern or feature. The convolutional block can recognize several local patterns simultaneously by utilizing multiple filters, which improves its capacity to comprehend the context of the input text. In order to further process and integrate the collected features, the output of the convolutional block is often sent via other layers like pooling layers or recurrent layers like LSTM. In order to forecast the probability distribution of the word from the learned representations, a thick layer, or SoftMax layer, is eventually frequently used.

Moreover, the convolutional block is introduced before bidirectional LSTM (Long Short-Term Memory) to encode spatial information. Intermittently, the user while typing tends not to rectify their typos, thereby the coordinates that are being touched by the user can be added as additional information in input to the model to provide better results on correction, suggestion, and prediction. Hence, each letter is divided into four specific coordinates so as to avoid unique inputs and limit it just like characters. These coordinates help to understand and get extra information if the user might have typed an incorrect/proximity letter.

According to one embodiment of the present invention, the decoder model of the prediction module obtains the input from the encoder model, which is passed through multiple layers comprising an embedding layer, an LSTM layer, and a dense layer to provide word suggestions. The LSTM layer helps in the collection and retention of long-term dependencies in the input text. The dense layer carries out the final classification or regression operation in a language model by translating the learned features to the desired output format. Furthermore, the word suggestions obtained from the decoder of the prediction module are optimized into probable candidates by using beam search, language model, penalty, and ranking. The beam search involves optimizing the time and solution. The language model controls the scoring according to the valid prefix given by the user and the candidates obtained from the decoder. Further, the penalty influences the score by checking the distance between the last word of the valid prefix input provided by the user and the output obtained by the decoder and penalizing the score according to the distance between the two words. The ranking helps to sort all the candidates according to the score, to provide top-k score candidates.

Furthermore, the language model includes multiple dictionaries, starting with bigrams and to pentagrams. The multiple dictionaries also have the keys for every prefix, and their items are all possible words for that prefix written by the users. Each of these words also has a score associated with it, indicating the frequency at which the user uses it. Also, in the language model, more preference is given to higher n-gram dictionaries.

FIG. 1 illustrates a flowchart on the method for character-to-character modeling for word suggestion and auto-correction, according to an embodiment of the present invention. The method 100 comprises inputting text in the text field by a user through a keyboard and performing text cleaning at step 102. The method 100 further involves ensuring the last character of the text provided by the user in the text field is a space or a letter at step 104. Further, the method 100 involves invoking word suggestion or auto-correction, if the text entered by the user ends with a letter at step 106, such that the method for word suggestion or auto-correction comprises the steps of: creating candidates with an edit distance; filtering valid candidates by using a hash table; assigning scores to the valid candidates to obtain a plurality of candidates; passing each of the plurality of candidates to an encoder-decoder model to obtain completed words; concatenating each of the completed words and assigning scores and ranking; and displaying the word suggestion on a suggestion strip. The candidates are possible words suggested or auto corrected by the method as the user types in the text field. Besides, the valid candidates comprise only the alphabet of the desired language. Furthermore, the method 100 involves invoking word prediction, if the text entered by the user ends with a space at step 108; and the method for word prediction comprises the steps of: fetching an auto-corrected candidate from the last suggestion; calculating the score for the auto-corrected candidate, and selecting the auto-corrected candidate with the highest score; replacing the last word with a threshold candidate and sending the text for next word prediction if the score of the auto-corrected candidate is greater than the threshold candidate; sending the text for next word prediction if the score of the auto-corrected candidate is less than the threshold candidate; and obtaining the next word prediction and displaying the word prediction on the suggestion strip.

FIG. 2 illustrates an architectural block diagram of an exemplary implementation of the system for character-to-character modeling for word suggestion and auto-correction, according to an embodiment of the present invention. The system 200 comprises a data preparation module 206 configured to obtain input text into the text field by a user through a keyboard 202 and perform text cleaning. The data preparation module 206 is also configured to invoke word suggestion or auto-correction by creating candidates with an edit distance and filtering valid candidates by using a hash table if the text entered by the user ends with a letter to invoke word prediction by fetching auto-corrected candidate from the last suggestion if the text entered by the user ends with a space. Further, the candidates are possible words suggested or auto-corrected by the system as the user types in the text field, and the valid candidates comprise only alphabets of the desired language. Furthermore, the system 200 comprises a prediction module 208 configured to receive input from the data preparation module 206 to provide word suggestions for completion or word prediction as output. The prediction module 208 is also configured to provide word suggestions by assigning scores to the valid candidates, which is the output of the data preparation module 206 to obtain a plurality of candidates and passing each of the plurality of candidates to an encoder-decoder model to obtain completed words. Furthermore, the prediction module 208 is also configured to provide word prediction by calculating the score for the auto-corrected candidate, selecting the auto-corrected candidate with the highest score, replacing the last word with a threshold candidate, sending the text for next word prediction, if the score of the auto-corrected candidate is greater than the threshold candidate, and sending the text for next word prediction, if the score of the auto-corrected candidate is less than the threshold candidate. Moreover, the system 200 comprises a word suggestion module 210 configured to provide word suggestions as output by concatenating each of the completed words of the prediction module, assigning a score and rank, and displaying the word suggestion on a suggestion strip. The system 200 also comprises a word prediction module 210*a* configured to provide word prediction by obtaining the next word prediction from the prediction module and displaying the word prediction on the suggestion strip.

Figure 3:
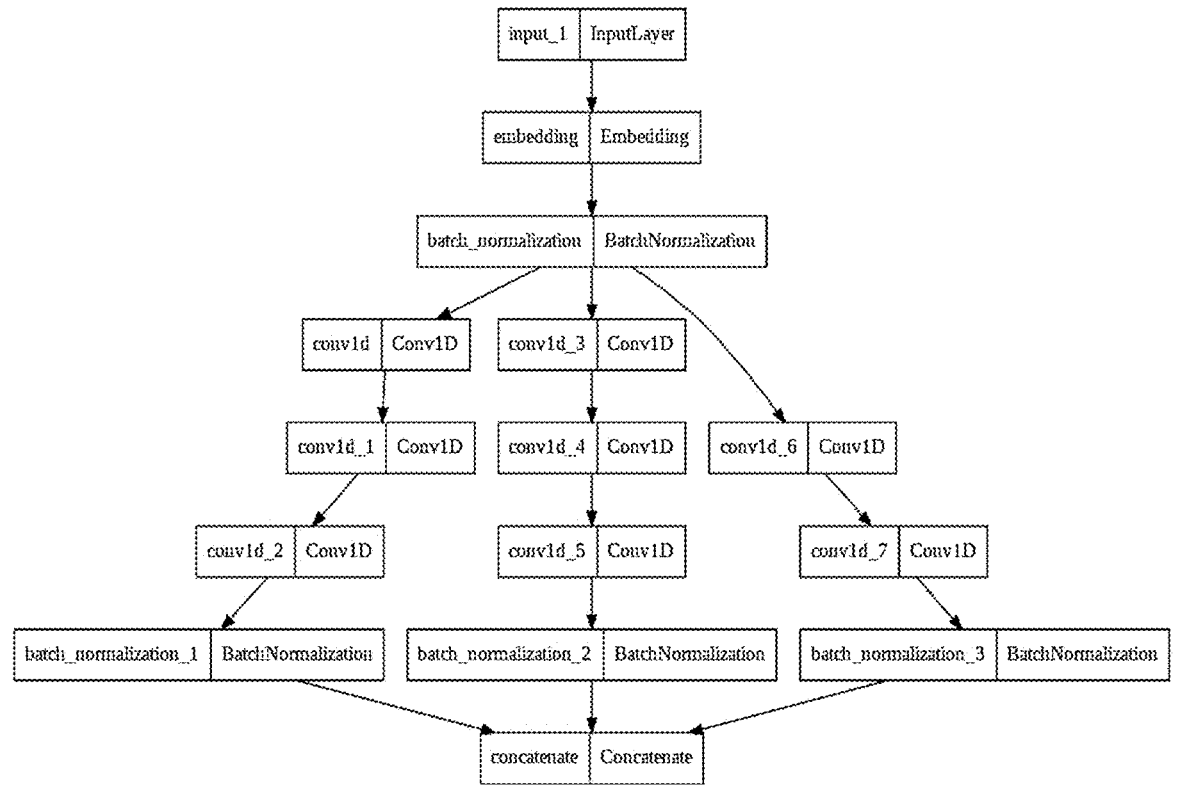
FIG. 3 illustrates a convolutional block in the encoder, according to an embodiment of the present invention.

FIG. 3 illustrates a convolutional block in the encoder, according to an embodiment of the present invention. An encoder is a deep learning model made up of a convolutional block comprising multiple convolutional layers followed by a bi-directional LSTM for encoding the output of the data preparation stage. The encoder comprises the convolutional block for capturing the relationship between characters within words by reading spatial correlation.

Figure 4A:
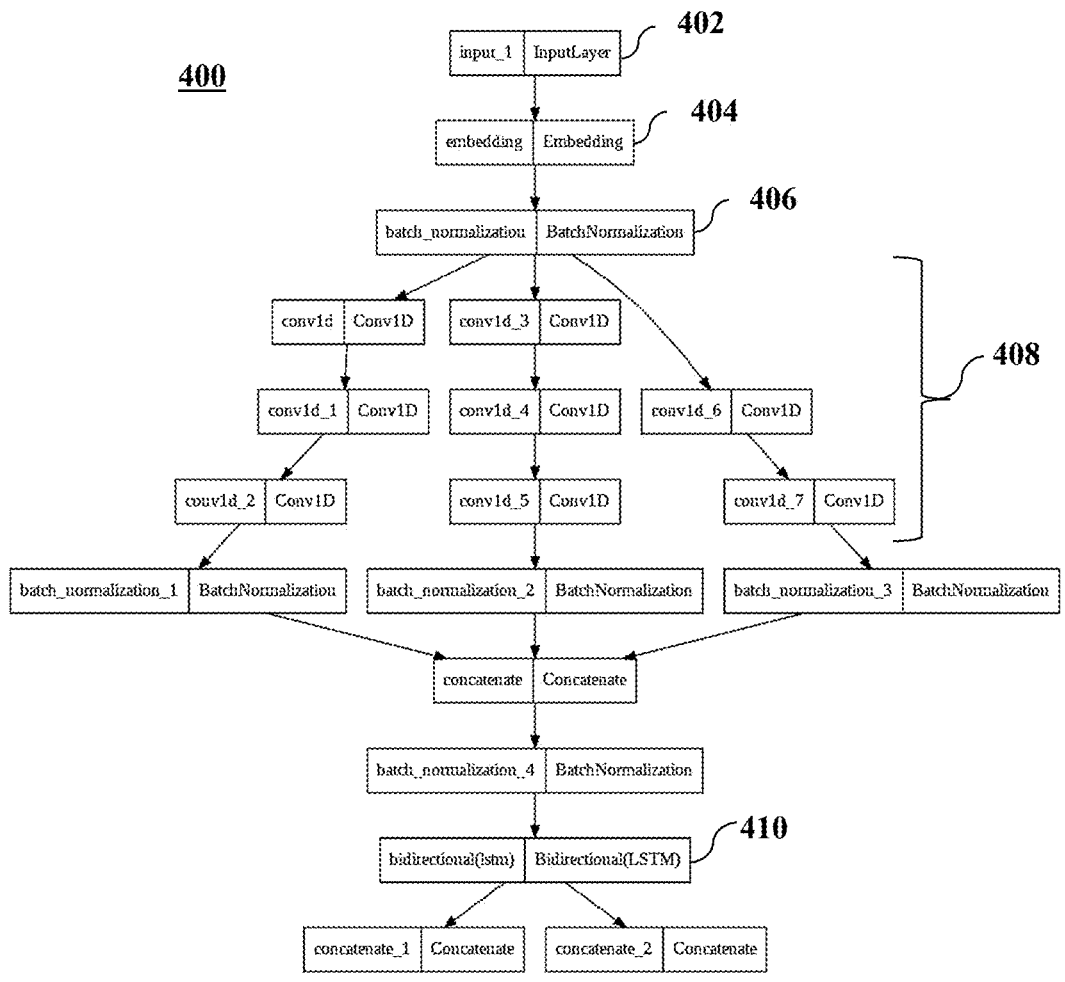
FIG. 4A illustrates an encoder model architecture, according to an embodiment of the present invention.

FIG. 4A illustrates an encoder model architecture, according to an embodiment of the present invention. The encoder model 400 in FIG. 4 is a deep learning model made up of a convolutional block comprising multiple convolutional layers followed by a bi-directional LSTM for encoding the output of the data preparation stage. In the encoder model 400, the first layer is the input layer 402, configured to take in the input from the user in tokenized format. The next layer is the embedding layer 404, which transforms discrete input values into continuous vector representations. Further, the encoder model 400 comprises a batch normalization layer 406, which normalizes the activations of a neural network layer improving training speed and stability. In addition, the encoder model 400 comprises a convolution block 408 comprising multiple convolutional layers, which extracts different features from input sequences by applying a series of sliding filters, enhancing the encoder model's 400 ability to capture complex patterns and relationships within the data. Furthermore, the results from the convolution block 408 are concatenated before sending the results as input to the bi-directional LSTM layer 410. The encoder model 400 further comprises the bi-directional LSTM 410 configured to input sequences in both forward and backward directions, allowing the encoder model 400 to capture the past and future context simultaneously, thus enhancing the understanding of the sequence data. Further, the sequence data is concatenated forward and backward for the hidden state and forward and backward for the cell state to provide the input to the decoder.

FIG. 4B illustrates the screenshot of the encoder model summary, according to an embodiment of the present invention. The encoder model is composed of multiple layers, including an embedding layer, a convolutional block comprising multiple convolutional layers, batch normalization, and bidirectional LSTM, to provide an output that is passed to the decoder.

Figure 5A:
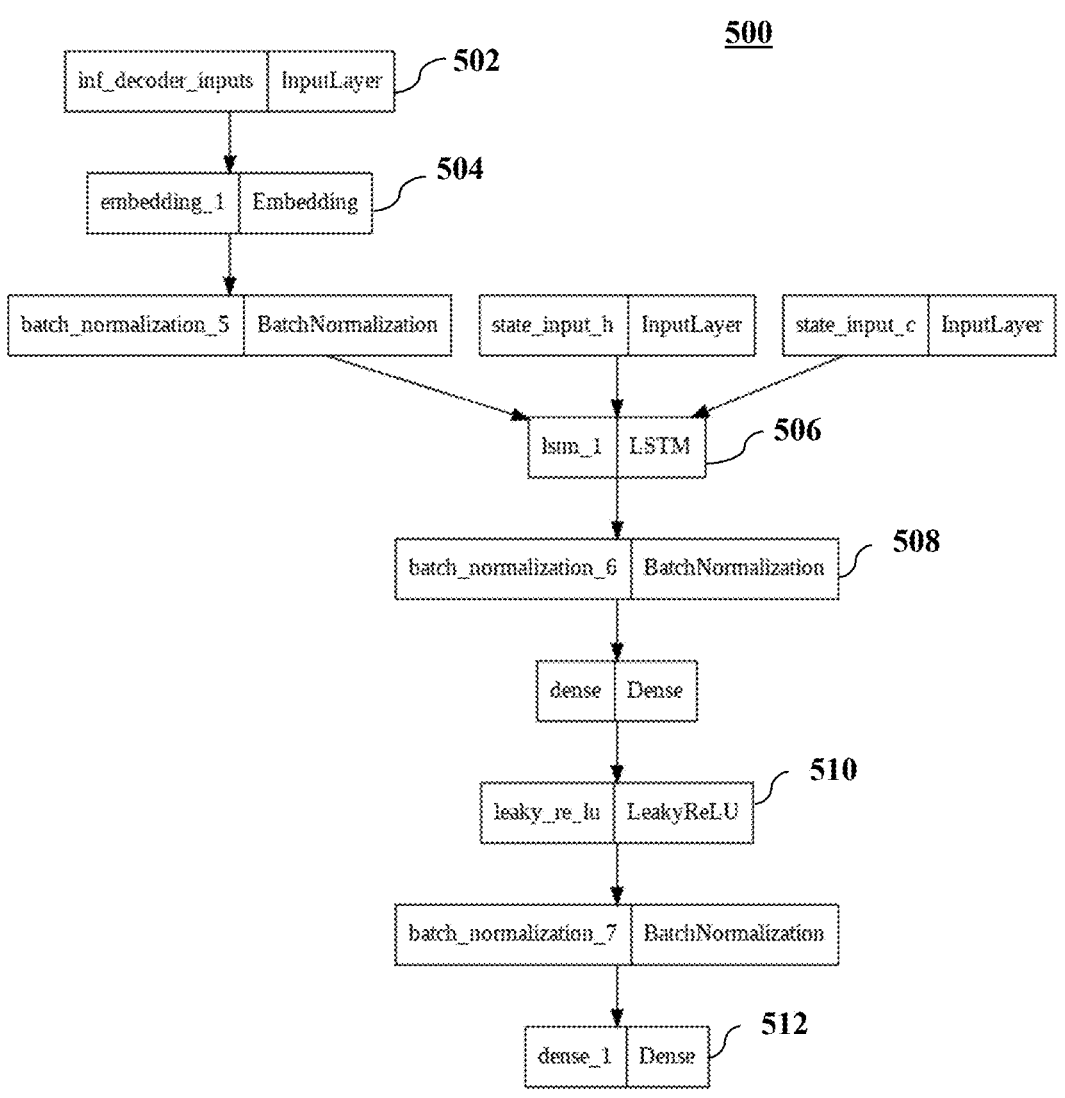
FIG. 5A illustrates a decoder model architecture, according to an embodiment of the present invention.

FIG. 5A illustrates a decoder model architecture, according to an embodiment of the present invention. The decoder model 500 comprises an input layer 502 configured to take in the input from the user in tokenized format. The decoder model 500 further comprises an embedding layer 504, which transforms discrete input value into a continuous vector representation. Further, the decoder model 500 comprises a LSTM layer 506, which is a recurrent neural network RNN that effectively manages long-range dependencies in sequential data by selectively remembering and forgetting information over time. In addition, the batch normalization 508 normalizes the activations of the neural network layer to improve training speed and stability. Furthermore, the decoder model 500 comprises an activation layer 510 that introduces a small slope for negative input values, preventing the complete death of the neurons and alleviating the vanishing gradient problem. Moreover, the decoder model 500 comprises a dense layer 512, which is a neural network that applies a linear transformation followed by a non-linear activation function to produce output values.

FIG. 5B illustrates the screenshot of the decoder model summary, according to an embodiment of the present invention. The decoder model obtains the input from the encoder model, which is passed through multiple layers comprising an embedding layer, an LSTM layer, and a dense layer to provide the word suggestions.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phrascology or terminology employed herein is for the purpose of description and not of limitation. Therefore, while the embodiments herein have been described in terms of preferred embodiments, those skilled in the art will recognize that the embodiments herein can be practiced with modifications.

Advantages of the Invention

The various embodiments of the present invention provide a system and a method for character-to-character modeling for word suggestion and auto-correction. The key requirement of the embodiments herein is the ability to intelligently text touch or tap entry, including saving in keyboard touch/tap entry, faster response with a lighter interface to support. Hence, the embodiments herein provides on-device support for word completion on all mobile-device applications with virtual keyboard such as What-sApp. Furthermore, the word prediction stage of the embodiments herein is made up of deep learning models alone in comparison to existing word predictions, which is a combination of LSTM and FST. Moreover, the embodiments herein finds applications across all messaging, chatting, and various platforms which requires one to type and maintain longer context, social networking applications, operating systems, virtual text input methods. The embodiments herein is also capable of contextualized predictions, personalized spelling coverage and character-based modeling ensuring on-the fly typing support.

Furthermore, the embodiments herein encompasses an advanced encoder-decoder model that incorporates additional functional supports such as beamwidth, penalty, ranking, and language model functions. These enhancements further reinforce its robustness in handling macaronic languages while minimizing performance tradeoffs and achieving low latency results. Furthermore, the model's compact size enables easy deployment on mobile devices, ensuring its size remains small. By leveraging the capabilities of beamwidth, penalty, ranking, and language model functions, the embodiments herein excels in generating real-time word completion, correction, and suggestion features for individuals typing on mobile phones. This enables an enhanced typing experience with prompt and accurate assistance. The embodiments herein emphasis on macaronic language support ensures optimal results for inputs that encompass a mixture of multiple languages. It comprehensively understands and addresses the specific nuances, grammar rules, and vocabulary of input written by the user, facilitating precise and contextually appropriate responses.

Therefore, the embodiments herein provides a significant advancement in effectively handling macaronic languages. Through its additional functional supports, such as beamwidth, penalty, ranking, and language model functions, it achieves remarkable performance with minimal latency. The model's small size enables seamless deployment on mobile devices, allowing for real-time word completion, correction, and suggestion functionalities. With its tailored approach to macaronic languages, the model delivers exceptional results, making it an invaluable tool for users working with such language inputs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phrascology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

We claim:

1. A computer-implemented method executed by a hardware processor in a computer system to perform a character-to-character modelling for a next-word prediction and an auto-correction, the method comprising the following steps of:

a. inputting text in a text field by a user through a keyboard and performing a text cleaning, and wherein the text cleaning removes invalid characters in the inputted text provided by the user which generates a cleaned input text, and subjecting characters in the cleaned input text to a tokenization;

b. ensuring a last character of the cleaned input text is a space character or a letter c. invoking the auto-correction, if in an event the cleaned input text ends with the letter the invoking of the auto-correction comprises the following steps:
　i. creating candidates with an edit distance, wherein the candidates include possible word suggestions, wherein said possible word suggestions include first auto-corrected candidates generated as the user types the input text in the text field;
　ii. using the hash table to: remove invalid candidates and obtain valid candidates wherein the hash table contains a valid prefix list, and wherein the valid candidates comprise only an alphabet of a set language desired by the user;
　iii. assigning a first score to each of the valid candidates;
　iv. passing each of the valid candidates to an encoder and a decoder to obtain completed words;
　v. generating first word suggestions by concatenating each of the completed words, assigning a second score to each of the generated first word suggestions, and ranking each of the generated first word suggestions according to their respective second score;
　vi. displaying the first word suggestions on a suggestion strip;

d. invoking the next-word prediction, in an event the cleaned input text with a space character and the step of invoking the next-word prediction comprises the following steps:
　i. fetching second auto-corrected candidates from second generated word suggestions;
　ii. calculating a third score for each of the second auto-corrected candidates and selecting a auto-corrected candidate of second auto-corrected candidates having a highest third score among the calculated third scores;

iii. generating the next-word prediction by replacing a last word of the cleaned input text with a threshold candidate, in an event the highest third score is greater than the score of the threshold candidate;

iv. selecting the cleaned input text as the next-word prediction, in an event the highest third score is less than the threshold candidate; and v. obtaining the next-word prediction and displaying the next word prediction on the suggestion strip.

2. The method of claim 1, wherein the invalid characters include special characters excluding the space character, numbers, and other characters, excluding alphabets, and wherein the tokenization is a number-based representation for each letter in the cleaned input text.

3. The method of claim 1, wherein the hash table is employed to remove the invalid candidates based on the valid prefix list and obtain the valid candidates, wherein the valid prefix list comprises at least a minimum of one letter as an input, said input comprising only the alphabet of the set language, and provided with a corresponding token number, and the token number is a number representation for each letter in the cleaned input text, and the next-word prediction is invoked when the valid prefix list ends with a the space character, and the auto-correction is invoked when the valid prefix list ends with a letter.

4. The method of claim 1, wherein the method further includes: passing the valid candidates, obtained based on the valid prefix list, as an input to the encoder and decoding the completed words generated by the encoder through the decoder, wherein the encoder is a deep learning model created with a cascade interconnection of convolutional blocks comprising multiple convolutional layers and a bidirectional LSTM (Long Short-Term Memory), and wherein the decoder is a LSTM (Long Short Term Memory) based model for predicting the first word suggestions, and wherein the first word suggestions are displayed to the user along with the auto-correction after the user types the input text, and after encountering the space character;

wherein the deep learning model is composed of first multiple layers, including an embedding layer, a convolutional block comprising the multiple convolutional layers, and batch normalization, to generate the completed words that are passed onto the decoder, and wherein the embedding layer transforms the cleaned input text into dense numerical vectors and captures semantic relationships and contextual data, and wherein the convolutional block identifies local patterns in the cleaned input text and pulls out pertinent information from words nearer to the cleaned input text to predict a next word relevant to the cleaned input text, and wherein the bidirectional LSTM processes the cleaned input text simultaneously in a forward direction and a backward direction, thereby enabling the encoder to extract context from both past and future data, and wherein the bidirectional LSTM is assigned with weights usable as initial weights for the decoder; and wherein the first word suggestions obtained from the decoder are optimized based on a beam search, a language model, by assigning a penalty, and by assigning the ranking, and wherein the language model controls the score assigned to the valid candidates based on the valid prefix list and the first word suggestions obtained from the decoder, and wherein the penalty influences the first score by checking the edit distance between the last word of the cleaned input text and each of the word suggestions obtained from the decoder and by penalizing the first score according to the distance between the valid candidates and the first word suggestions, and wherein the first word suggestions are ranked according to the second scores, to generate top-k score candidates.

5. The method of claim 4, wherein the decoder is configured to receive the completed words from the encoder and process said completed words using second multiple layers, including a second embedding layer, an LSTM layer, and a dense layer to provide the word suggestions, and wherein the LSTM layer collects and retains long-term dependencies in the completed words, and wherein the dense layer carries out a final classification operation in a the language model by translating learned dependencies into a desired output format.

6. A computer-implemented system (200) comprising a hardware processor configured to execute computer-readable instructions stored on anon-transitory computer-readable storage medium to perform character-to-character modelling for next-word prediction and auto-correction, the system further comprising:

a. a data preparation module (206), executed by the hardware processor, configured to obtain input text by a user and perform text cleaning to generate cleaned input text by removing invalid characters from the input text, and wherein the data preparation module (206), executed by the hardware processor, is configured to invoke the auto-correction in an event the cleaned input text ends with a letter, said data preparation module (206), executed by the hardware processor, configured to implement the auto-correction by:

creating candidates with an edit distance, and wherein the candidates include possible word suggestions, wherein said possible word suggestions further include auto-corrected candidates generated as the user types the input text;

removing the invalid candidates and obtaining valid candidates by using a hash table containing a valid prefix list, and wherein the valid candidates comprise only an alphabet of a set language desired by the user;

said data preparation module (206), executed by the hardware processor, further configured to implement the next-word prediction in an event the cleaned input text ends with a space character, said data preparation module (206), executed by the hardware processor, further configured to implement the next-word prediction by:

fetching the auto-corrected candidates from first word suggestions generated by a prediction module (208);

b. the prediction module (208), executed by the hardware processor, configured to:

assign a first score to each of the valid candidates;

pass each of the valid candidates to an encoder and a decoder and obtain completed words from the encoder and the decoder;

calculate a third score for each of the auto-corrected candidates fetched by the data preparation module (206);

select an auto-corrected candidate with a highest third score and replace a last word of the cleaned text input with a threshold candidate to generate a modified cleaned input text; and wherein the prediction module (208), executed by the hardware processor, is configured to implement the next-word prediction based on the modified cleaned input text in an event the highest third score is greater than the score of the threshold candidate, and wherein the prediction module (208), executed by the hardware processor, is further configured to select the cleaned input text as the next-word prediction, in an event the highest third score is less than the score of threshold candidate;

c. a word suggestion module (210), executed by the hardware processor, configured to generate the first word suggestions by concatenating each of the completed words generated by the prediction module (208), and by assigning a second score to each of generated first word suggestions, and by ranking each of the generated first word suggestions according to their respective second score, said word suggestion module (210), executed by the hardware processor, further configured to displaying the generated first word suggestions on a suggestion strip; and d. a word prediction module (210*a*), executed by the hardware processor, configured to obtain the next-word prediction from the prediction module (208) and displaying the next word prediction on the suggestion strip.

7. The system (200) as claimed in claim 6, wherein the data preparation module (206), executed by the hardware processor, subjects characters in the cleaned input text to tokenization, wherein the invalid characters include special characters excluding the space character, numbers, and other characters excluding alphabets, and wherein the tokenization is a number-based representation for each letter in the cleaned input text.

8. The system (200) as claimed in claim 6, wherein the hash table is used by the data preparation module (206), executed by the hardware processor, to remove the invalid candidates based on the valid prefix list and to obtain the valid candidates, wherein the valid prefix list comprises at least a minimum of one letter as an input, said input comprising only the alphabet of the set language, and provided with a corresponding token number, and wherein the token number is a number representation for each letter in the cleaned input text, and wherein the next-word prediction is invoked when the valid prefix list ends with the space character, and auto-correction is invoked when the valid prefix list ends with a letter.

9. The system (200) as claimed in claim 6, wherein the valid candidates obtained based on the valid prefix list are passed onto the encoder as an input, and wherein the encoder is a deep learning model created with a cascade interconnection of convolutional blocks comprising multiple convolutional layers and a bidirectional LSTM (Lonq Short- Term Memory), and wherein the decoder is a LSTM (Long Short Term Memory) based model for predicting the first word suggestions, and wherein the first word suggestions are displayed to the user along with the auto-correction the user types the input text, and after encountering the space character;

wherein the deep learning model is composed of first multiple layers, including an embedding layer, a convolutional block comprising the multiple convolutional layers, and batch normalization, to generate the completed words that are passed onto the decoder, and wherein the embedding layer transforms the cleaned input text into dense numerical vectors and captures semantic relationships and contextual data, and wherein the convolutional block identifies local patterns in the cleaned input text and pulls out pertinent information from words nearer to the cleaned input text to predict a next word relevant to the cleaned input text, and wherein the bidirectional LSTM processes the cleaned input text simultaneously in a forward direction and a backward direction, thereby enabling the encoder to extract context from both past and future data, and wherein the bidirectional LSTM is assigned with weights usable as initial weights for the decoder; and wherein the first word suggestions obtained from the decoder are optimized based on a beam search, a language model, by assigning a penalty, and by assigning the ranking, and wherein the language model controls the score assigned to the valid candidates based on the valid prefix list and the first word suggestions obtained from the decoder, and wherein the penalty influences the first score by checking the edit distance between the last word of the cleaned input text and each of the word suggestions obtained from the decoder and by penalizing the first score according to the distance between the valid candidates and the first word suggestions, and wherein the first word suggestions are ranked according to the second scores, to generate top-k score candidates.

10. The system (200) as claimed in claim 9, wherein the decoder is configured to receive the completed words from the encoder and process said completed words using second multiple layers, including a second embedding layer, an LSTM layer, and a dense layer to provide the word suggestions, and wherein the LSTM layer collects and retains long term dependencies in the completed words, and wherein the dense layer carries out a final classification operation in a the language model by translating learned dependencies into a desired output format.

\* \* \* \* \*